US012587231B2

(12) United States Patent
Bauder et al.

(10) Patent No.: US 12,587,231 B2
(45) Date of Patent: Mar. 24, 2026

(54) BROADBAND HIGH POWER TRX HYBRID IMPLEMENTATION

(71) Applicant: Infineon Technologies AG, Neubiberg (DE)

(72) Inventors: Ruediger Bauder, FeldkirchenWesterham (DE); Georg Lischka, Poing (DE); Markus Kratzer, Linz (AT); Ahmed Elmaklizi, Munich (DE)

(73) Assignee: Infineon Technologies AG, Neubiberg (DE)

( * ) Notice: Subject to any disclaimer, the term of this patent is extended or adjusted under 35 U.S.C. 154(b) by 362 days.

(21) Appl. No.: 18/450,147

(22) Filed: Aug. 15, 2023

(65) Prior Publication Data

US 2024/0063843 A1 Feb. 22, 2024

Related U.S. Application Data

(60) Provisional application No. 63/371,578, filed on Aug. 16, 2022.

(51) Int. Cl.
| | |
|---|---|
| *H04B 1/18* | (2006.01) |
| *H04B 1/3888* | (2015.01) |
| *H04B 1/58* | (2006.01) |

(52) U.S. Cl.
CPC .......... *H04B 1/587* (2013.01); *H04B 1/3888* (2013.01); *H04B 1/586* (2013.01)

(58) Field of Classification Search
CPC ... H04B 1/38; H04B 1/40; H04B 1/44; H04B 1/587; H04B 7/0868; H01L 21/02496; H01P 5/00; H01P 5/12
See application file for complete search history.

(56) References Cited

U.S. PATENT DOCUMENTS

| | | | | |
|---|---|---|---|---|
| 10,171,112 B2 * | 1/2019 | Ma | ...................... | H04B 1/0057 |
| 10,630,241 B2 * | 4/2020 | Ahmed | ................... | H01P 5/185 |
| 10,665,952 B2 * | 5/2020 | Fina | ........................ | H01P 3/121 |

* cited by examiner

*Primary Examiner* — Tuan Pham
(74) *Attorney, Agent, or Firm* — Slater Matsil, LLP

(57) ABSTRACT

A transceiver hybrid includes a multi-layer laminated hybrid comprising a coupler, the coupler including a first metal layer in a first layer of the multi-layer laminated hybrid having a first end coupled to a termination terminal and a second end coupled to a quadrature terminal; and a second metal layer in a second layer of the multi-layer laminated hybrid having a first end coupled to an antenna terminal, and a second end coupled to an in-phase terminal, wherein a width of the first metal layer is greater than a width of the second metal layer, such that a registration error margin is formed between the first metal layer and the second metal layer.

20 Claims, 11 Drawing Sheets

Asymmetric Coupler construction

1100A

1100B

1100C

BROADBAND HIGH POWER TRX HYBRID IMPLEMENTATION

CROSS-REFERENCE TO RELATED APPLICATIONS

This application claims the benefit of U.S. Provisional Application No. 63/371,578, filed on Aug. 16, 2022, and to U.S. application Ser. No. 18/450,139 filed on Aug. 1, 2023, entitled "BROADBAND HIGH POWER TRANSMIT/RECEIVE SWITCH SYSTEM", both of which applications are hereby incorporated herein by reference.

TECHNICAL FIELD

The present invention relates generally to a broadband high power transceiver (TRX) hybrid implementation.

BACKGROUND

Time division duplexed (TDD) active antenna systems (AAS) are known in the art for use in, for example, 5G networks ($5^{th}$ generation mobile networks). Active antenna systems (AAS) are used to increase the capacity and coverage of radio streams. Active antenna systems feature a tighter integration of radio frequency (RF) electronics with a multiple-element antenna array to enable miniaturization and to boost efficiency. 5G base stations apply a high number of transmit and receive antenna elements for serving multiple users with parallel data streams. Some active antenna systems include a digital baseband transceiver, an RF frontend, and the multiple-element antenna array. The digital baseband transceiver can include a digital baseband and field-programmable gate array section, a mixed signal section including digital-to-analog converters (DACs) and analog-to-digital converters (ADCs), and a transceiver section for receiving and transmitting RF analog signals. The RF frontend can include driver amplifiers, power amplifiers, variable gain amplifiers, low noise amplifiers, and filters, as well as high voltage RF switching circuitry. In some applications, the RF switching circuitry can experience extremely high RF voltages. To handle these high RF voltages, the switching circuitry must be designed to include multiple stacked transistor stages increasing circuit area and costs. Furthermore, the extremely high RF voltages can lead to premature switching circuit failure.

SUMMARY

According to an embodiment, a transceiver hybrid comprises a multi-layer laminated hybrid comprising a coupler, the coupler comprising a first metal layer in a first layer of the multi-layer laminated hybrid having a first end coupled to a termination terminal and a second end coupled to a quadrature terminal; and a second metal layer in a second layer of the multi-layer laminated hybrid having a first end coupled to an antenna terminal, and a second end coupled to an in-phase terminal, wherein a width of the first metal layer is greater than a width of the second metal layer, such that a registration error margin is formed between the first metal layer and the second metal layer.

According to an embodiment, a switch system comprises a multi-layer laminated hybrid comprising a coupler, the coupler comprising a first metal layer in a first layer of the multi-layer laminated hybrid having a first end coupled to a termination terminal and a second end coupled to a quadrature terminal; and a second metal layer in a second layer of the multi-layer laminated hybrid having a first end coupled to an antenna terminal, and a second end coupled to an in-phase terminal; and an integrated circuit comprising a plurality of radio frequency (RF) switches affixed to an upper surface of the multi-layer laminated hybrid, wherein the RF switches are electrically coupled to the quadrature terminal and to the in-phase terminal.

According to an embodiment a method of operating a switch system, wherein the switch system includes a multi-layer laminated hybrid comprising a coupler, the coupler comprising a first metal layer in a first layer of the multi-layer laminated hybrid having a first end coupled to a termination terminal and a second end coupled to a quadrature terminal; and a second metal layer in a second layer of the multi-layer laminated hybrid having a first end coupled to an antenna terminal, and a second end coupled to an in-phase terminal; and an integrated circuit comprising a plurality of radio frequency (RF) switches to an upper surface of the multi-layer laminated hybrid, wherein the RF switches are electrically coupled to the quadrature terminal and to the in-phase terminal, the method comprising opening the plurality of RF switches in a receive mode of operation; and closing the plurality of RF switches in a transmit mode of operation to reflect RF power to the termination terminal.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In the following detailed description, reference is made to the accompanying drawings, which form a part hereof and in which are shown by way of illustrations specific embodiments in which the invention may be practiced. It is to be understood that other embodiments may be utilized and structural or logical changes may be made without departing from the scope of the present invention. For example, features illustrated or described for one embodiment can be used on or in conjunction with other embodiments to yield yet a further embodiment. It is intended that the present invention includes such modifications and variations. The examples are described using specific language, which should not be construed as limiting the scope of the appending claims. The drawings are not scaled and are for illustrative purposes only. For clarity, the same or similar elements have been designated by corresponding references in the different drawings if not stated otherwise.

Figure 1:
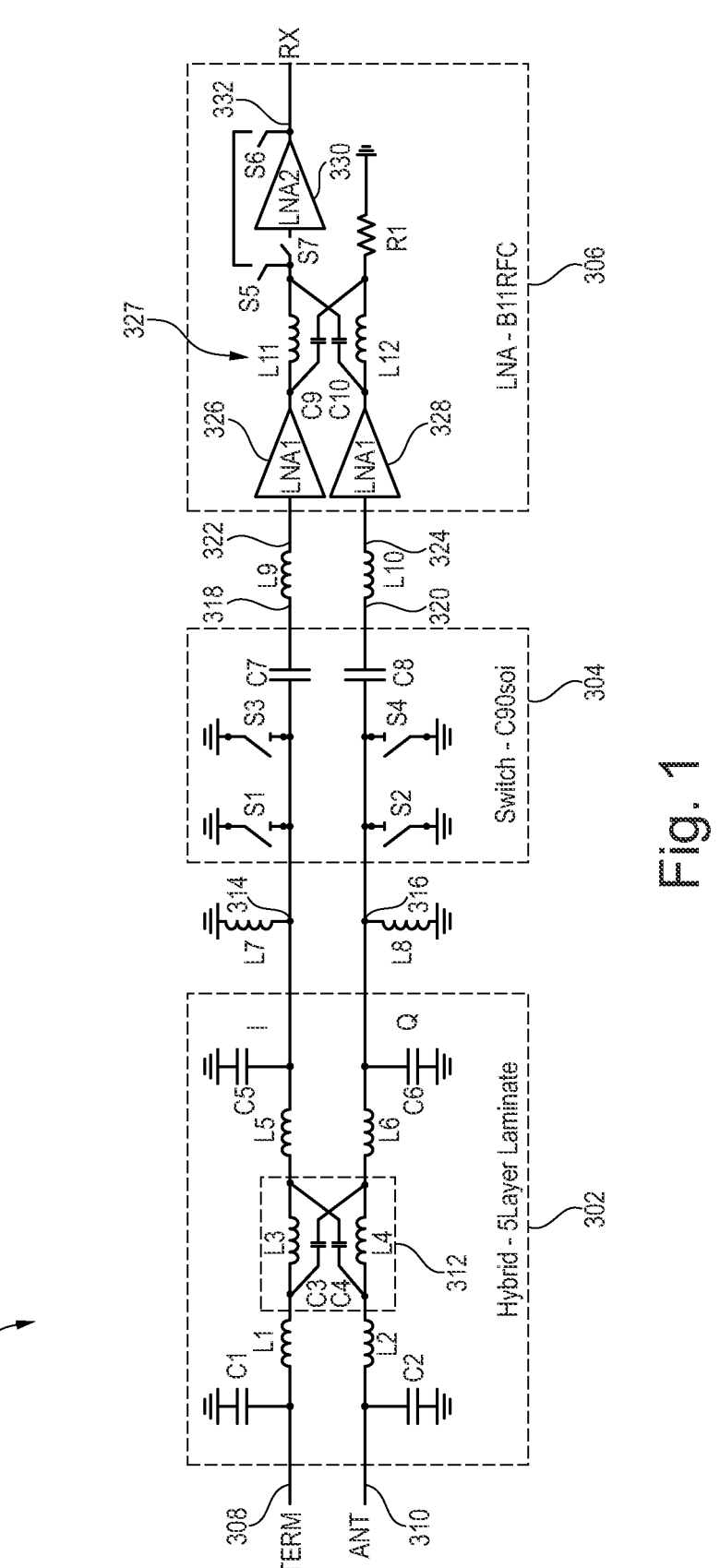
FIG. 1 is a block diagram of a switch system for an active antenna system (AAS) according to an embodiment.

FIG. 1 is a block diagram and equivalent circuit of an RF switch system 100 for an active antenna system (AAS) according to an embodiment. An active antenna system including RF switch system 100 is explained in further detail in U.S. application Ser. No. 18/450,139 filed on Aug. 1, 2023, entitled "BROADBAND HIGH POWER TRANSMIT/RECEIVE SWITCH SYSTEM".

Switch system 100 comprises a first hybrid coupler 302 having a first node coupled to a TERM termination terminal 308, a second node coupled to an ANT antenna terminal, a third node coupled to a "Q" quadrature terminal 316, and a fourth node coupled to an "I" in-phase terminal 314. RF switch system 100 also comprises a radio frequency (RF) switch 304 having a first switch S1 coupled between the in-phase terminal 314 and ground, and a second switch S2 coupled between the quadrature terminal 316 and ground, wherein the termination terminal 308 is configured for coupling to the load 130 (shown in FIG. 1), wherein the load 130 and the RF switch 304 dissipate RF power due to a transmit mode insertion loss, and wherein a majority of the RF power is reflected into the load 130 by the first hybrid coupler 302. In an embodiment, during a transmit mode of operation, at least 90% of the RF power is reflected into the load 130 and less than 3% of the RF power is dissipated in the RF switch 304. RF switch system 100 also comprises a low noise amplifier circuit having inputs coupled to terminal 322 and terminal 324, and an output coupled to the RX receive output at terminal 332.

In an embodiment, the first hybrid coupler 302 comprises two coupled lines of a multi-layer laminated hybrid, the RF switch 304 comprises an integrated circuit affixed to the multi-layer laminated hybrid, and the low noise amplifier circuit 306 comprises one or more integrated circuits and optional external components. The multi-layer laminated hybrid is explained in further detail below with respect to drawing FIGS. 2-12.

A lumped-model equivalent circuit of the two coupled lines 312 of the first hybrid coupler 302 includes inductor L3 and inductor L4, capacitor C3 coupled between a first end of inductor L3 and a second end of inductor L4, and capacitor C4 coupled between a first end of inductor L4 and a second end of inductor L3. Further components of the first hybrid coupler 302 includes parasitic inductor L1 coupled to the first end of inductor L3, parasitic inductor L2 coupled to the first end of inductor L4, parasitic inductor L5 coupled to the second end of inductor L3, and parasitic inductor L6 coupled to the second end of inductor 14. The first hybrid coupler 302 further comprises capacitor C1 coupled between terminal 308 and ground, capacitor C2 coupled between terminal 310 and ground, capacitor C5 coupled between terminal 314 and ground, and capacitor C6 coupled between terminal 316 and ground. These parasitic components model the package parasitics of the hybrid, in an embodiment. Capacitors C1, C2, C5, and C6 are capacitances for tuning the RF characteristics of the first hybrid coupler 302.

Switch system 100 of FIG. 1 further comprises a first inductor L7 coupled between the in-phase terminal 314 and ground, and a second inductor L8 coupled between the quadrature terminal 316 and ground.

In some embodiments, the RF switch 304 comprises a third switch S3 also coupled between the in-phase terminal 314 and ground, and a fourth switch S4 also coupled between the quadrature terminal 316 and ground. The parallel configuration of switches S1 and S2, and S3 and S4 are used in some embodiments for greater reliability and high input power handling ability. Quality is improved by sharing the high input power handling between two switches. Switches S1 and S2 are switched together and switches S3 and S4 are also switched together. The operation and control of switches S1, S2, S3, and S4 is described in further detail below. RF switch also includes DC blocking capacitors C7 coupled between terminals 314 and 318 and C8 coupled between terminals 316 and 320. DC blocking capacitors C7 and C8 can be omitted in some embodiments depending on the design of the low noise amplifier circuit 306.

Switch system 100 of FIG. 1 further comprises a third inductor L9 coupled between terminal 318 and terminal 322, and a fourth inductor L10 coupled between terminal 320 and terminal 324.

In an embodiment, inductors L7, L8, L9, and L10 are non-parasitic inductors. Inductors L7 and L8 are used for parasitic capacitance compensation of the input capacitance of RF switch 304. In particular, inductors L7 and L8 are used to compensate the Coff capacitance of RF switch 304 and to provide improved ESD protection. In an embodiment, inductors L7 and L8, and the Coff capacitance of RF switch 304 creates a resonant tank circuit at the RF frequency of interest (high AC impedance). Inductors L9 and L10 are used to match the input capacitance of the low noise amplifier circuit 306. Adjusting component values using matching techniques are known in the art, for example using a Smith Chart or using RF matching software. In some embodiments, a noise match is made in order to decrease the noise figure of the system, even though the resulting match may result in some reflection.

In an embodiment, low noise amplifier circuit 306 comprises low noise amplifier 326 having an input coupled to terminal 322 and a low noise amplifier 328 coupled to terminal 324. The outputs of low noise amplifier 326 and low noise amplifier 328 are coupled to a second hybrid coupler 327 including inductor L11 and inductor L12, capacitor C9 coupled between a first end of inductor L11 and a second end of inductor L12, and capacitor C10 coupled between a first end of inductor L12 and a second end of inductor L11. Inductors L11 and L12, and capacitors C9 and C10 represent a lumped element model of the second hybrid coupler 327. Low noise amplifier circuit 306 further comprises low noise amplifier 330 selectively coupled between the second hybrid coupler 327 through switches S5, S6, and S7 and the RX output at terminal 332. When additional gain from low noise amplifier 330 is required switches S5 and S6 are open and switch S7 is closed. When additional gain is not required, switches S5 and S6 are closed and switch S7 is open to bypass low noise amplifier 330. The second hybrid coupler 327 can comprise an on-chip hybrid on the one or more low noise amplifier integrated circuits. In some embodiments the second hybrid coupler can comprise a discrete Surface Mount Device (SMD) implementation using separate inductors and capacitors, or an implementation similar to that used for the first hybrid coupler 302 (multi-layer laminate hybrid). The second hybrid coupler 327 is "matched" to the first hybrid coupler 302 as is explained in further detail below.

In the receive mode of operation, the ANT signal at terminal 308 is split into the I/Q signal at terminals 314 and 316. These signals pass through RF switch 304 (i.e., switches S1, S2, S3, and S4 are open) and be routed to the inputs of low noise amplifier 326 and low noise amplifier 328. Low noise amplifier 326 and low noise amplifier 328 amplify the I/Q signal. The second hybrid coupler 327 sums the amplified I/Q signal into a single-ended signal. This single-ended signal will be either amplified by low noise amplifier 330 or directly routed to the RX terminal 332 as explained above. The first hybrid coupler 302 (specifically the equivalent circuit of the two coupled lines 312) is "matched" with the second hybrid coupler 327. The term "matched" is defined herein as both hybrid couplers 302 and 327 having the same amplitude and phase characteristics. The matched hybrid couplers advantageously results in the noise at the TERM terminal 308 being cancelled.

Figure 2:
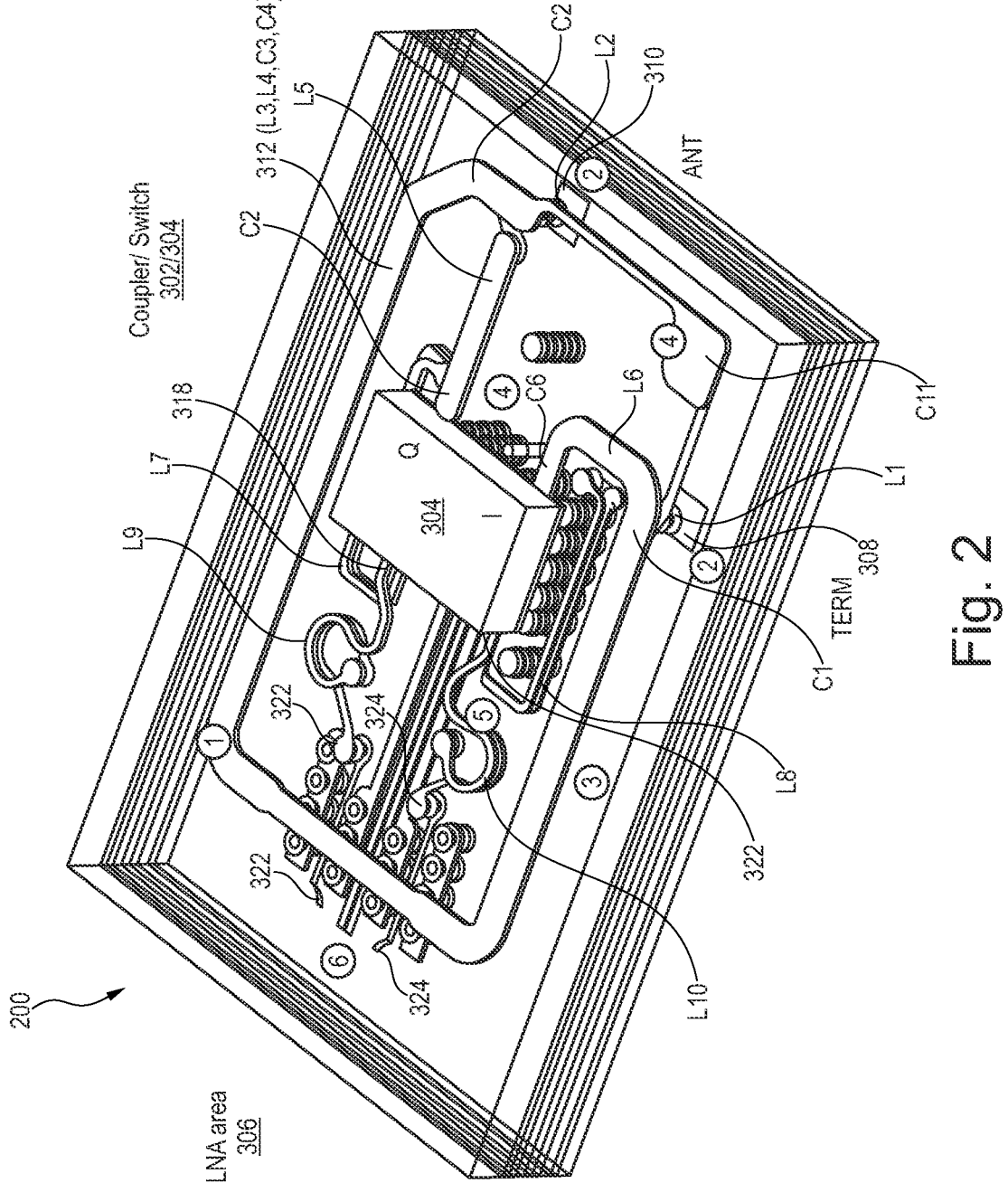
FIG. 2 is a perspective view of a high power TRX hybrid, according to an embodiment.

FIG. 2 is a perspective view of a high power TRX hybrid, according to an embodiment. The high power TRX hybrid is implemented in a multiple layer laminate hybrid, comprising a plurality of metal and insulating layers. The first hybrid coupler 302 is implemented in the multiple laminate hybrid, and the RF switch 304 is implemented as a packaged integrated circuit that is affixed to a top layer of the multiple laminate hybrid. A view the top layer of the multiple laminate hybrid is shown without the RF switch 304 is further detail in, for example, FIG. 8. Capacitors, inductors, and nodes are located and identified in FIG. 2. Capacitors are formed by at least two patterned metal areas in two separate laminated layers, separated by at least one patterned insulation areas in at least one laminated layer. Inductors are formed by the inductance of a patterned metal length in a single laminated layer. Nodes are formed by a junction in a metal layer between, for example an inductor and a capacitor.

FIG. 2 thus shows a transceiver hybrid 200 comprising a multi-layer laminated hybrid comprising a coupler 302, wherein the coupler comprises two coupled lines 312 (or "coils"). The first coupled line comprises a first metal layer in a first layer of the multi-layer laminated hybrid 200 having a first end coupled to a termination terminal 308 and a second end coupled to a quadrature terminal (underneath RF switch 304 and not clearly visible in FIG. 2). The second coupled line comprises a second metal layer in a second layer of the multi-layer laminated hybrid 200 having a first end coupled to an antenna terminal, and a second end coupled to an in-phase terminal (underneath RF switch 304 and not clearly visible in Figure). A width of the first metal layer is greater than a width of the second metal layer, such that a registration error margin is formed between the first metal layer and the second metal layer. The registration error margin is shown in greater detail in FIG. 3 and described in further detail below. It should be noted that individual impedance ($Z_O$) tuning of the primary (ANT) and secondary (TERM) coils (two coupled lines 312) are possible by adjusting their geometry. Numerous techniques for adjusting the impedance of coupler 302 are discussed below with respect to the discussion of FIG. 3.

In the transceiver hybrid 200 of FIG. 2, the two coupled lines 312 of coupler 302 is formed in a periphery of the multi-layer laminated transceiver hybrid 200 to form a routing loop eye opening as shown. The routing loop eye implementation advantageously provides good thermal performance (heat transfer), excellent real estate reuse by providing ample area for placing components inside the loop, and a high bandwidth due to the reduction of counter inductance (due to the different directions of current flow in the layout of the two coupled lines 312).

Figure 8:
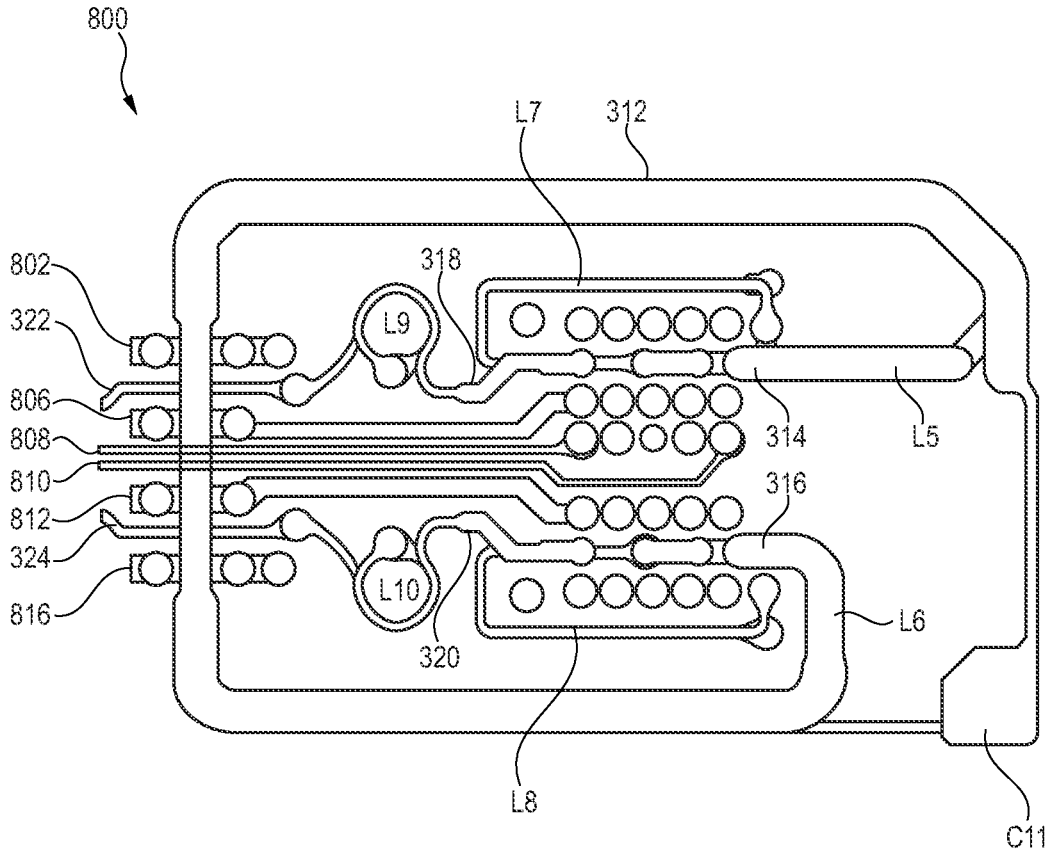
FIG. 8 is a plan view of an aperture shunt inductor partially visible in the perspective view of the high power TRX hybrid of FIG. 2.

In the transceiver hybrid 200 of FIG. 2, the first end of the first metal layer (bottom layer of the pair in metal layer M02) is coupled to the TERM termination terminal, and the first end of the second metal layer (top layer of the pair in metal layer M01) is coupled to the ANT antenna terminal. The second ends of the two coupled lines 312 terminate in the in-phase and quadrature terminals. In FIG. 2, these terminals are obscured by the RF switch 302 integrated circuit package. The in-phase and quadrature terminals are best seen in FIG. 8 and are described in further detail below. The layout of coupler 302 provides good return loss (RL), bandwidth (BW) and insertion loss (IL) because of the proximity of the first ends of the first and second metal layers to the ANT antenna terminal and the TERM termination terminal and the proximity of the second ends of the first and second metal layers to the "I" in-phase terminal and the "Q" quadrature terminal.

The transceiver hybrid 200 of FIG. 2 comprises a first inductor (L8) coupled between the quadrature terminal (node 316) and ground, and a second inductor (L7) coupled between the in-phase terminal (node 314) and ground. The second inductor L7 is partially obscured by the RF switch 304 integrated circuit package, as well as node 314 and node 316. First inductor L8 and second inductor L7 are implemented in separate metal layers of transceiver hybrid 200, advantageously consume very low hybrid real estate, and are robust against mutual coupling with the two coupled lines 312 of the hybrid coupler core. Inductors L7 and L8 provide Coff compensation of RF shunt switch 304 in the off mode (RX mode) and also provide extended ESD protection according to International Electrotechnical Commission (IEC) testing standards.

The transceiver hybrid 200 of FIG. 2 comprising a third inductor (L9) formed in at least a first metal layer of the multi-layer laminated hybrid that is isolated from the quadrature terminal (not clearly visible in FIG. 2) and the in-phase terminal (also not clearly visible in FIG. 2), and a fourth inductor (L10) formed in at least the first metal layer of the multi-layer laminated hybrid that is isolated from the in-phase terminal. The electrical isolation of the inductors is provided by capacitors C7 and C8 in RF switch 304. Inductor L9 is formed between an RF switch output at node 318 and LNA input at node 322 on the in-phase path and inductor L10 is formed between another RF switch output at node 320 and LNA input at node 324 on the quadrature path. In an embodiment, inductor L9 and inductor L10 are formed in the first metal layer and the second metal layer of the multi-layer laminated hybrid 200. Inductor L9 and L10 include coupling enhancement and coupling reduction features, which are described below in further detail with respect to FIGS. 11A, 11B, and 11C.

Figure 3:
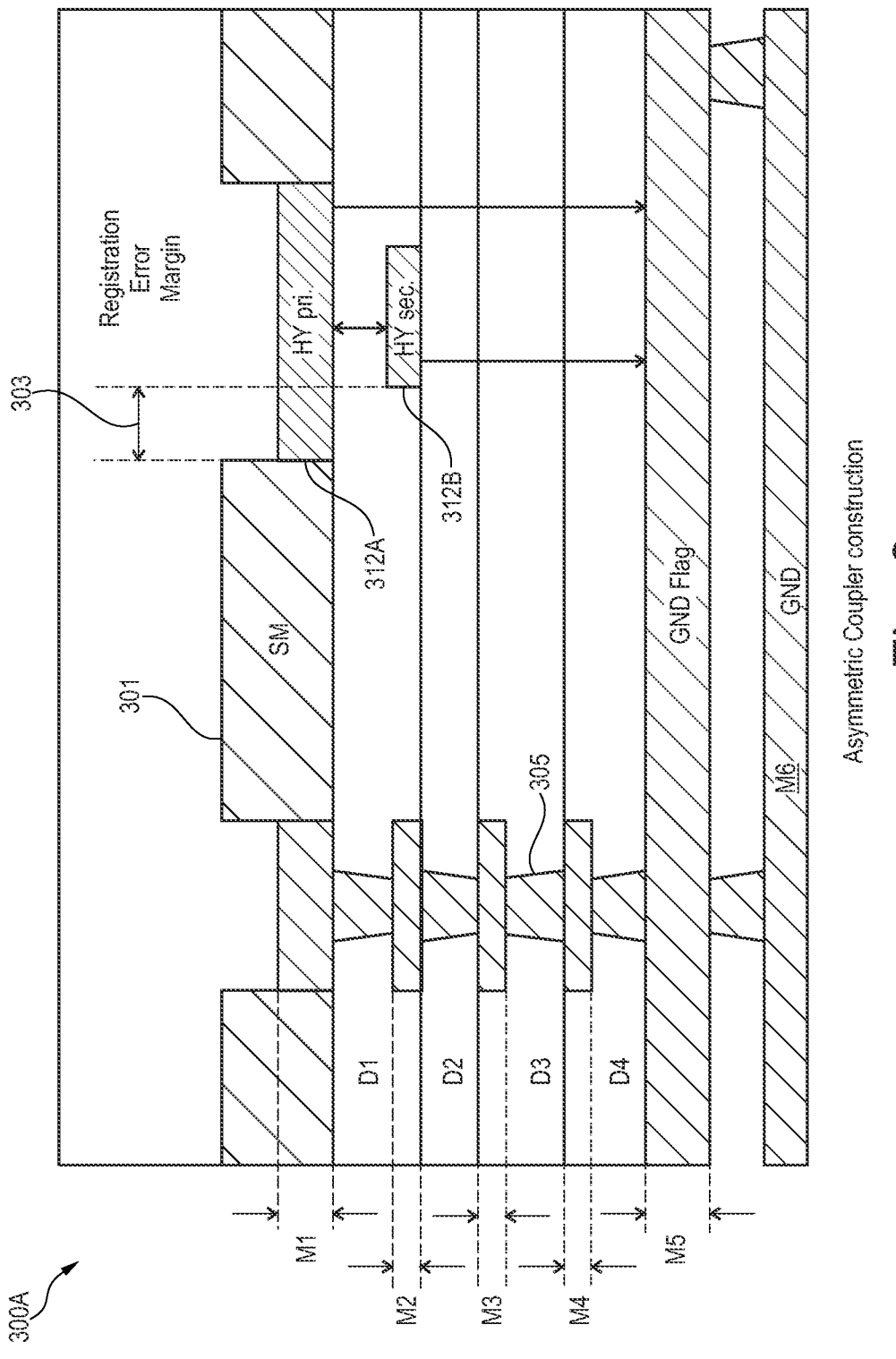
FIG. 3 is a cross-sectional view of the high power TRX hybrid of FIG. 2, particularly showing an asymmetrical coupler construction, according to an embodiment.

FIG. 3 is a cross-sectional view 300 of the high power TRX hybrid 200 of FIG. 2, particularly showing an asymmetrical coupler construction, according to an embodiment. The cross-sectional cut can be made across any location of the two coupled lines 312. In FIG. 3, the two coupled lines 312 are revealed to be a high voltage primary line 312A in a first metal layer M1 and a high voltage secondary line 312B in a second metal layer M3. The cross-sectional view 300 shows a hybrid implementation including a plurality of metal layers M1, M2, M3, M4, M5, and M6, as well as a plurality of interconnecting metal via layers such as via layer 305. The cross-sectional view 300 further shows a hybrid implementation comprising a plurality of insulating layers D1, D2, D3, and D4. For example, the high voltage primary line 312A is separated from the high voltage secondary line 312B with insulating layer D1. In an embodiment, the first metal layer M1 includes a surface passivation layer 301 (designated SM). In an embodiment, the M5 and M6 metal layers comprise ground (GND) layers. In an embodiment an asymmetrical coupler construction is used, wherein the high voltage primary line 312A has a greater width than the high voltage secondary line 312B, defining a registration error margin 303. The registration error margin 303 provides robust protection against layer registration errors. In other words, performance, such as desired impedance and phase values can be maintained even if the coupler metal layers are misaligned within the registration error margin 303.

Figure 4:
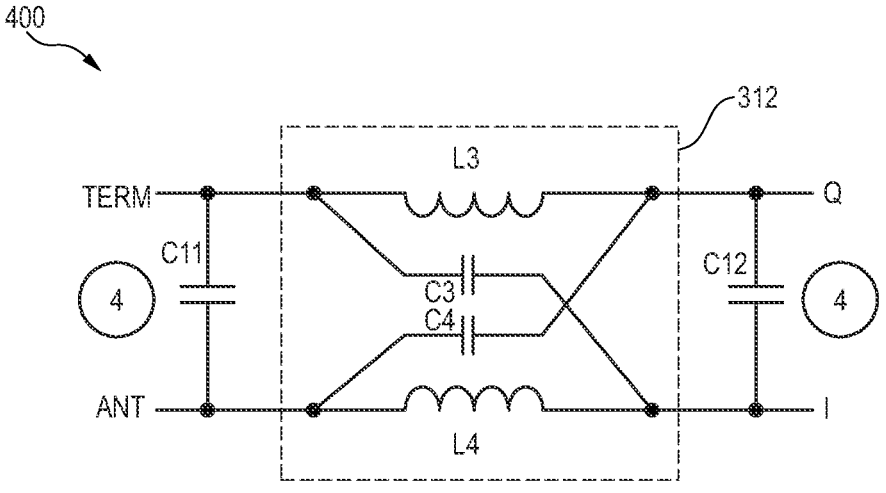
FIG. 4 is a portion of the first hybrid coupler of FIG. 1, according to another embodiment.

FIG. 4 is a portion 400 of the first hybrid coupler 302 of FIG. 1, according to another embodiment. Portion 400 includes the equivalent circuit model of the two coupled lines 312 of the first hybrid coupler 302, and further comprising a first capacitor C11 coupled between the TERM termination terminal and the ANT antenna terminal and/or a second capacitor C12 coupled between the "Q" quadrature terminal and the "I" in-phase terminal. Capacitors C11 and C12 are optional tuning components that can be used for realizing a desired hybrid impedance and phase shift.

Figures 5, 6, 7:
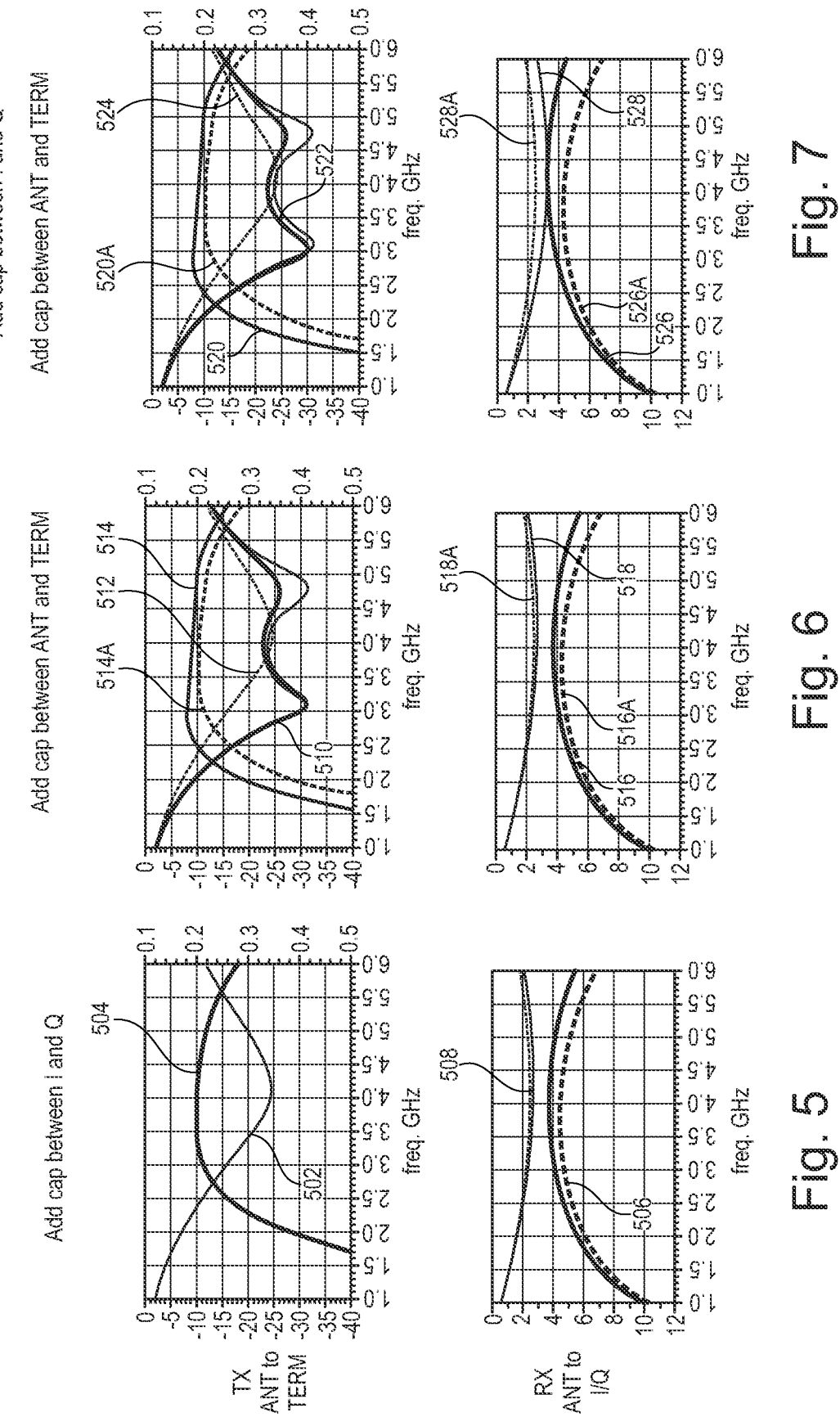
FIGS. 5, 6, and 7 are transmit (TX) mode and receive (RX) mode graphs illustrating the frequency response of the high power TRX hybrid, according to an embodiment.

FIG. 5 shows transmit (TX) mode and receive (RX) mode graphs illustrating the frequency response of the high power TRX hybrid, wherein a capacitor is affixed between the "I" and "Q" terminals, according to an embodiment. In the transmit mode, Sdb_term_TX 502=TX mode return loss [dB] at the TERM port, Sdb_ant_TX 502=TX mode return loss [dB] at the ANT port, and GdB 504=TX mode Transmission gain [dB] between the ANTENNA and TERM ports. In the receive mode, dB(SP.S(10,7)) 506=RX Mode Transmission gain between the ANT and Q terminals and dB(SP.S (9,7))508=RX Mode Transmission gain between the ANT and I terminals.

FIG. 6 shows transmit (TX) mode and receive (RX) mode graphs illustrating the frequency response of the high power TRX hybrid, wherein a capacitor is affixed between the "ANT" and "TERM" terminals, according to an embodiment.

In the transmit mode, Sdb_term_TX=TX mode return loss [dB] at the TERM port, wherein trace 510 demonstrates the response without a capacitor between the ANT/TERM and I/Q terminals, and wherein trace 512 demonstrates the response with the capacitor between the ANT/TERM terminals and without a capacitor between the I/Q terminals. Sdb_ant_TX=TX mode return loss [dB] at the ANT port, wherein trace 510 demonstrates the response without capacity between the ANT/TERM and I/Q terminals, and wherein trace 512 demonstrates the response with a capacitor between the ANT/TERM terminals and without a capacitor between the I/Q terminals. GdB=TX mode Transmission gain [dB] between the ANTENNA and TERM terminals. Trace 514a demonstrates the response with a capacitor between the ANT/TERM terminals and the I/Q terminals, and wherein trace 514 demonstrates the response with a capacitor between the ANT/TERM terminals and without a capacitor between the I/Q terminals.

In the receive mode, dB(SP.S(10,7))=RX Mode Transmission gain between the ANT and Q terminals. Trace 516a demonstrates the response without a capacitor between the ANT/TERM terminals and the I/Q terminals. Trace 516 demonstrates the response with a capacitor between the ANT/TERM terminals and without a capacitor between the I/Q terminals. dB(SP.S(9,7))=RX Mode Transmission gain between the ANT and I terminals. Trace 518a demonstrates the response without a capacitor between the ANT/TERM terminals and the I/Q terminals, and trace 518 demonstrates the response with a capacitor between the ANT/TERM terminals and without a capacitor between the I/Q terminals.

FIG. 7 shows transmit (TX) mode and receive (RX) mode graphs illustrating the frequency response of the high power TRX hybrid, wherein a capacitor is affixed between the "ANT" and "TERM" terminals, according to an embodiment.

In a transmit mode, Sdb_term_TX=TX mode return loss [dB] at the TERM port. Trace 524 demonstrates the response without a capacitor between the ANT/TERM terminals and the I/Q terminals. Trace 522 demonstrates the response with a capacitor between the ANT/TERM terminals and with a capacitor between the I/Q terminals. Sdb_ant_TX=TX mode return loss [dB] at the ANT port. Trace 524 demonstrates the response without a capacitor between the ANT/TERM terminals and the I/Q terminals. Trace 522 demonstrates the response with a capacitor between the ANT/TERM terminals and with a capacitor between the I/Q terminals. GdB=TX mode Transmission gain [dB] between the ANTENNA and TERM terminals. Trace 520a demonstrates the response without a capacitor between the ANT/TERM terminals and the I/Q terminals. Trace 520 demonstrates the response with a capacitor between the ANT/TERM terminals and with a capacitor between the I/Q terminals.

In a receive mode, dB(SP.S(10,7))=RX Mode Transmission gain between the ANT and Q terminals. Trace 526a demonstrates the response without a capacitor between the ANT/TERM terminals and the I/Q terminals. Trace 526 demonstrates the response with a capacitor between the ANT/TERM terminals and with a capacitor between the I/Q terminals. dB(SP.S(9,7))=RX Mode Transmission gain between the ANT and I terminals. Trace 528a demonstrates the response without a capacitor between the ANT/TERM terminals and without a capacitor between the I/Q terminals. Trace 528 demonstrates the response with a capacitor between the ANT/TERM terminals and with a capacitor between the I/Q terminals.

FIG. 8 is a plan view 800 of aperture shunt inductors L7 and L8 partially visible in the perspective view of the high power TRX hybrid 200 of FIG. 2. Series inductors 15 and L6 as well as inductors L9 and L10 are also clearly shown in the plan view 800. In pertinent part, the "I" and "Q" nodes 314 and 316 are clearly visible and not obscured by the RF switch 304 integrated circuit package. Nodes 318, 320, 322, and 324 are also shown. Plan view 800 also shows the two coupled lines 312 of coupler 302 and capacitor C11, previously described. Ground shield lines 802 and 806 are shown located on opposite lateral sides of the metal line of node 322, and ground shield lines 812 and 816 are shown located on opposite lateral sides of the metal line of node 324. Ground shield lines 806 and 812 are located on opposite lateral side of the metal lines associated with nodes 808 and 810. Nodes 808 and 810 are biasing (Vcc) and RX/TX mode control lines, in an embodiment.

Figure 9A:
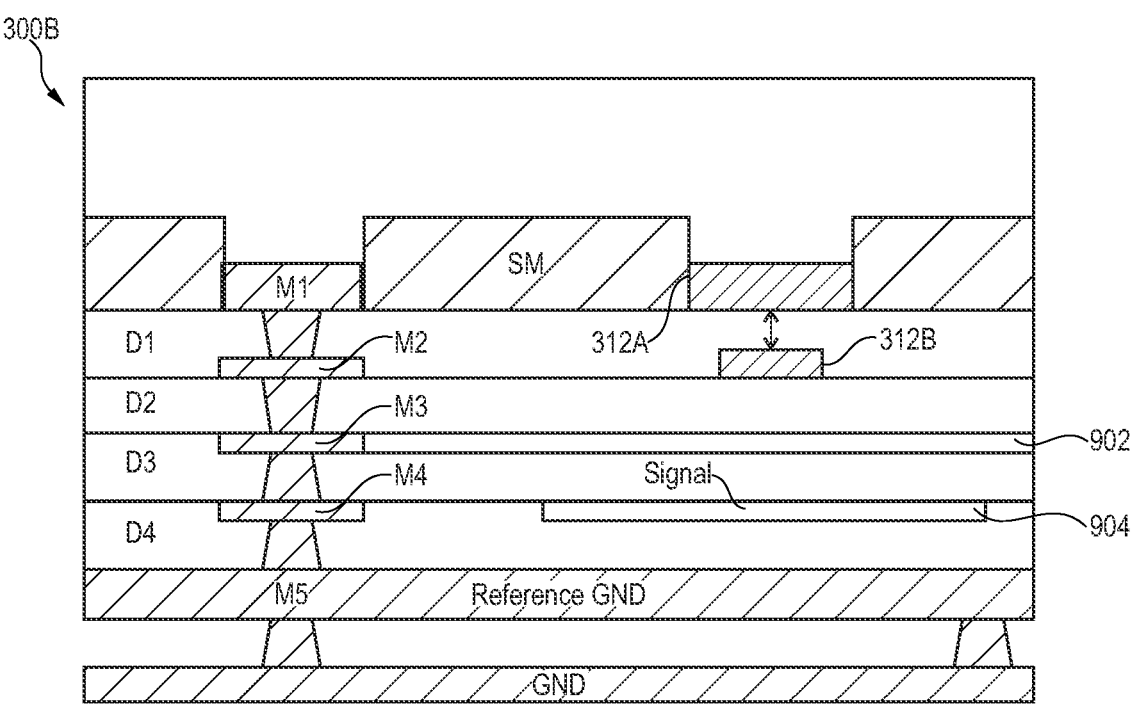
FIGS. 9A and 9B are cross-sectional views of the high power TRX hybrid of FIG. 2, particularly showing a compensated coupler with a shielded signal, according to an embodiment.
Figure 9B:
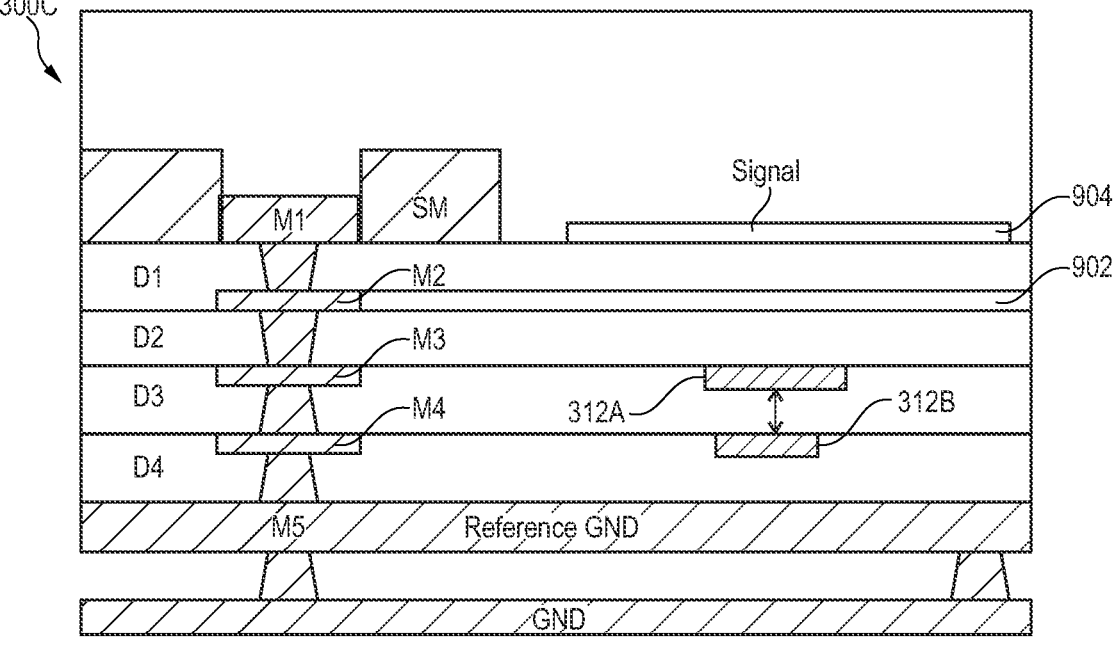

FIGS. 9A and 9B are cross-sectional views 300B and 300C of the high power TRX hybrid 200 of FIG. 2, particularly showing a compensated coupler with a shielded signal, according to an embodiments. The additional shielding is used, for example, where the two coupled lines 312 of coupler 304 cross over (or under) other signal lines in the high power TRX hybrid 200 as is shown in FIG. 8.

In FIG. 9A the high voltage primary line 312A is formed in metal layer M1 and the high voltage secondary line 312B is formed in metal layer M2. A grounded shield line 902 is formed in metal layer M3 and a signal line 904 is formed in metal layer M4. The grounded shield line 902 and the signal line 904 are orthogonal to the high voltage primary line 312A and the high voltage secondary line 312B, in an embodiment. The interference and coupling between signal line 904 and the two coupled lines 312 is minimized by the action of the grounded shield line 902 formed in metal layer M3. High voltage primary line 312A is insulated from high voltage secondary line 312B by insulating layer D1. The high voltage secondary line 312B is insulated from the grounded shield line 902 by insulating layer D2. The grounded shield line 902 is insulated from the signal line 904 by insulating layer D3. The signal line 904 is insulated from the reference ground line in metal layer M5 by insulating layer D4.

In FIG. 9B the high voltage primary line 312A is formed in metal layer M3 and the high voltage secondary line 312B is formed in metal layer M4. A grounded shield line 902 is formed in metal layer M2 and a signal line 904 is formed in metal layer M1. The grounded shield line 902 and the signal line 904 are orthogonal to the high voltage primary line 312A and the high voltage secondary line 312B, in an embodiment. The interference and coupling between signal line 904 and the two coupled lines 312 is minimized by the action of the grounded shield line 902 formed in metal layer M2. The signal line 904 is insulated from the grounded shield line 902 by insulating layer D1. The grounded shield line 902 is insulated from the high voltage primary line 312A by insulating layer D2. The high voltage primary line 312A is insulated from the high voltage secondary line 312B by insulating layer D3. The high voltage secondary line 312B is insulated from the reference ground line in metal layer M5 by insulating layer D4.

Figure 10:
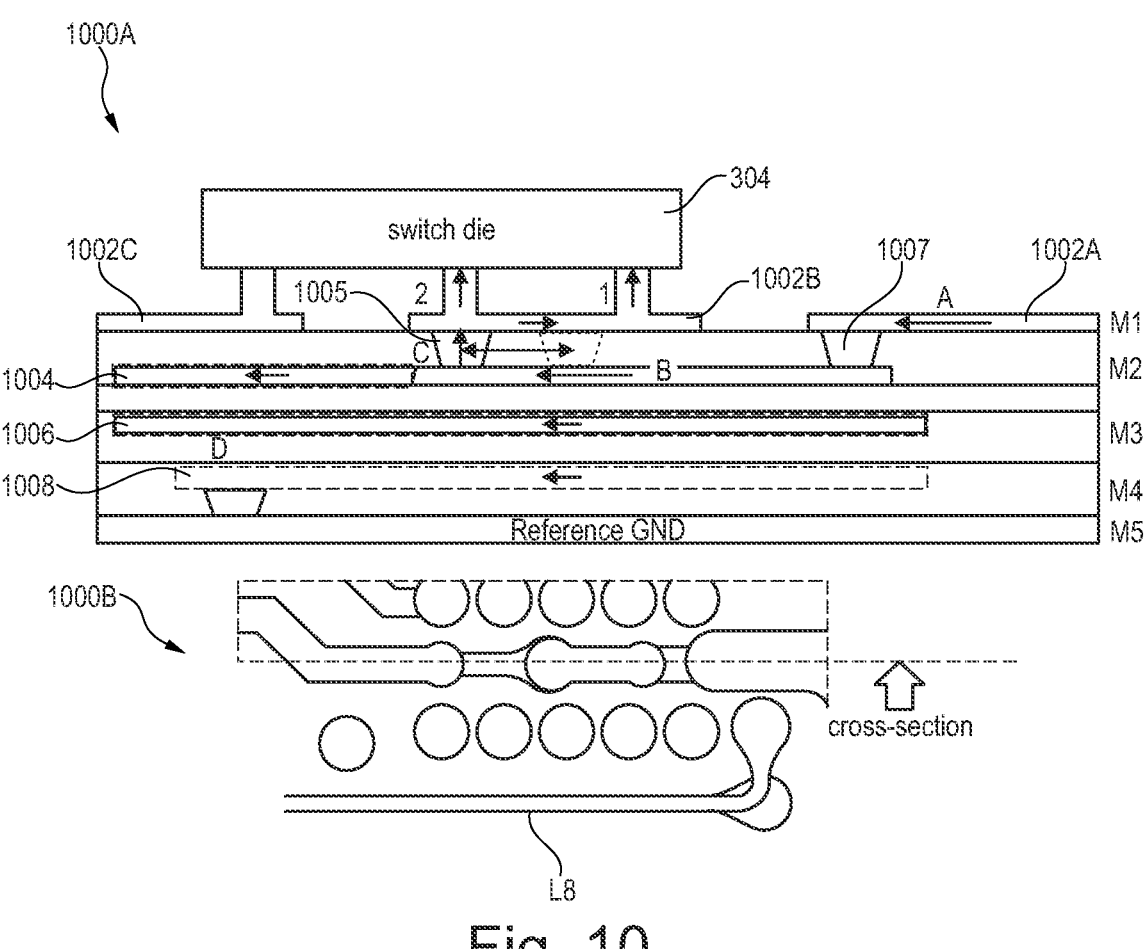
FIG. 10 is a cross-sectional view of the high power TRX hybrid of FIG. 2, particularly showing a space-saving structure by achieving a desired current distribution between several branches of the circuit in various layers of the hybrid.

FIG. 10 is a cross-sectional view 1000A of the high power TRX hybrid 200 of FIG. 2, particularly showing a space-saving structure by achieving a desired current distribution between several branches of the circuit in various layers of the hybrid. FIG. 10 also includes a corresponding plan view of a portion of high power TRX hybrid 200 showing a portion of interest surrounding inductor L8. Cross-sectional view 1000A shows metal layers M1, M2, M3, M4, and M5, and the RF switch 304 packaged integrated circuit coupled to metal layer M1. In an embodiment, a current flows into a portion 1002A of a metal line associated with metal layer M1 and flows through metal via 1007 into metal line 1004 associated with metal layer M2. The current then flows up through metal via 1005 into a portion 1002B also associated with metal layer ML The current flow is then distributed between first and second pins of RF switch 304. The output current of RF switch 304 flows through a third pin of RF switch 304 into a third pin of RF switch 304 into another portion 1002C of the metal line associated with metal layer M1. Cross-sectional view 1000A also shows a metal line 1006 associated with metal layer M3, and a grounded metal line 1008 associated with metal layer M4.

Figure 11A:
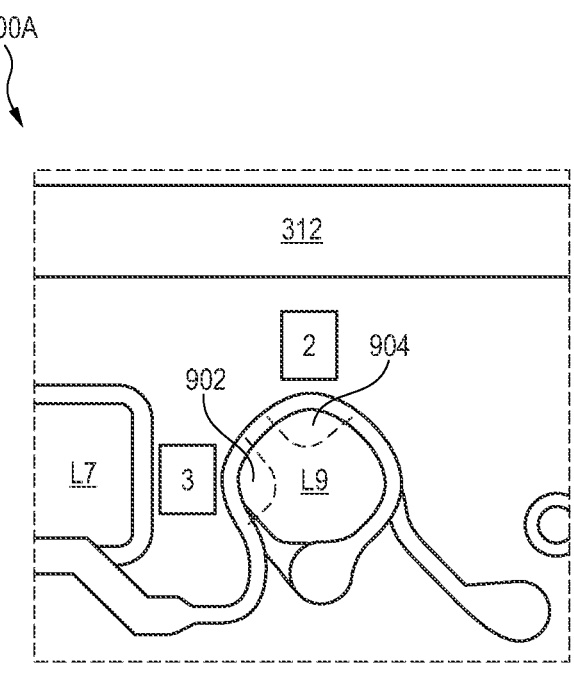
FIGS. 11A, 11B, and 11C are views of a portion of the high power TRX hybrid of FIG. 2, particularly showing a serial inductor of the switch system shown in FIG. 1, according to an embodiment.
Figure 11B:
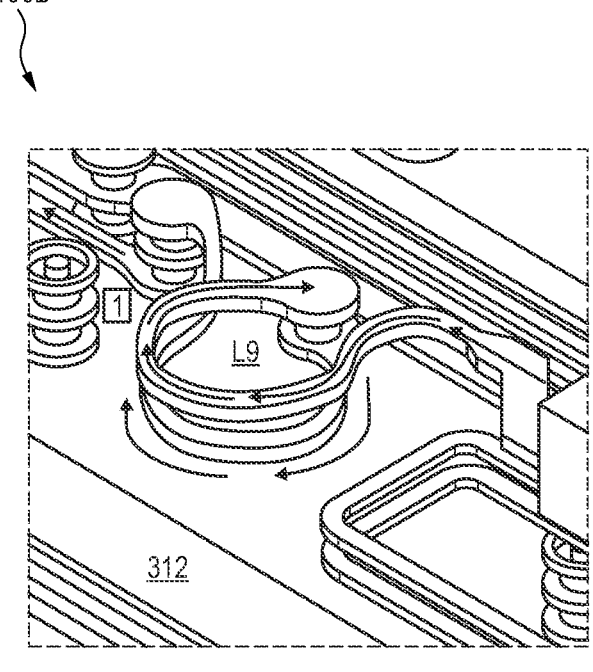
Figure 11C:
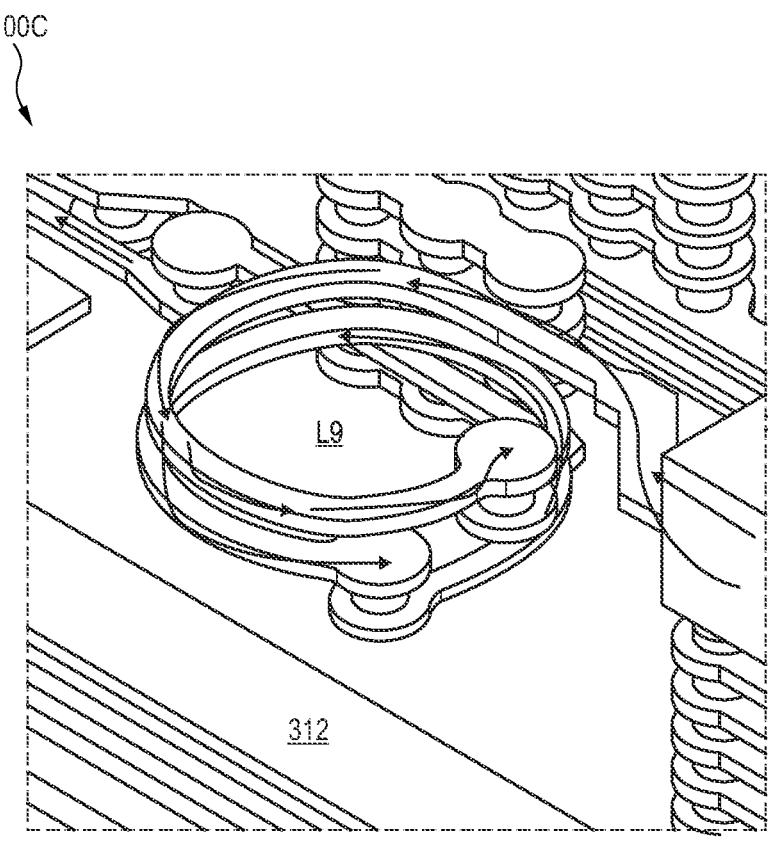

FIGS. 11A, 11B, and 11C are views of a portion of the high power TRX hybrid of FIG. 2, particularly showing a serial inductor of the switch system shown in FIG. 1, according to an embodiment.

FIG. 11A shows, in plan view 1100A, the relative locations of serial inductor L9, shunt inductor L7, and two coupled lines 312. A first portion 902 of inductor L9 faces shunt inductor L7 and a second portion of inductor L9 faces the two coupled lines 312. FIG. 11B shows a perspective view 1100B of inductor L9 allowing inductive coupling reduction with respect to the two coupled lines 312 of coupler 302. Coupling between inductors L9 and L7 and coupler 312 is reduced due to the shape and angle of inductor L9 by avoiding parallel lines of inductors L9 to L7 and coupler 312. FIG. 11C shows a perspective view 1100C of inductor L9 allowing inductive coupling enhancement with respect to the two coupled lines 312 of coupler 302. The coupling enhancement is due inside the L9 structure by causing more auto-transformation and therefore generating a larger inductance for a given series resistance of the inductor loops. This feature de facto increases the Q factor of inductor L9.

Figure 12:
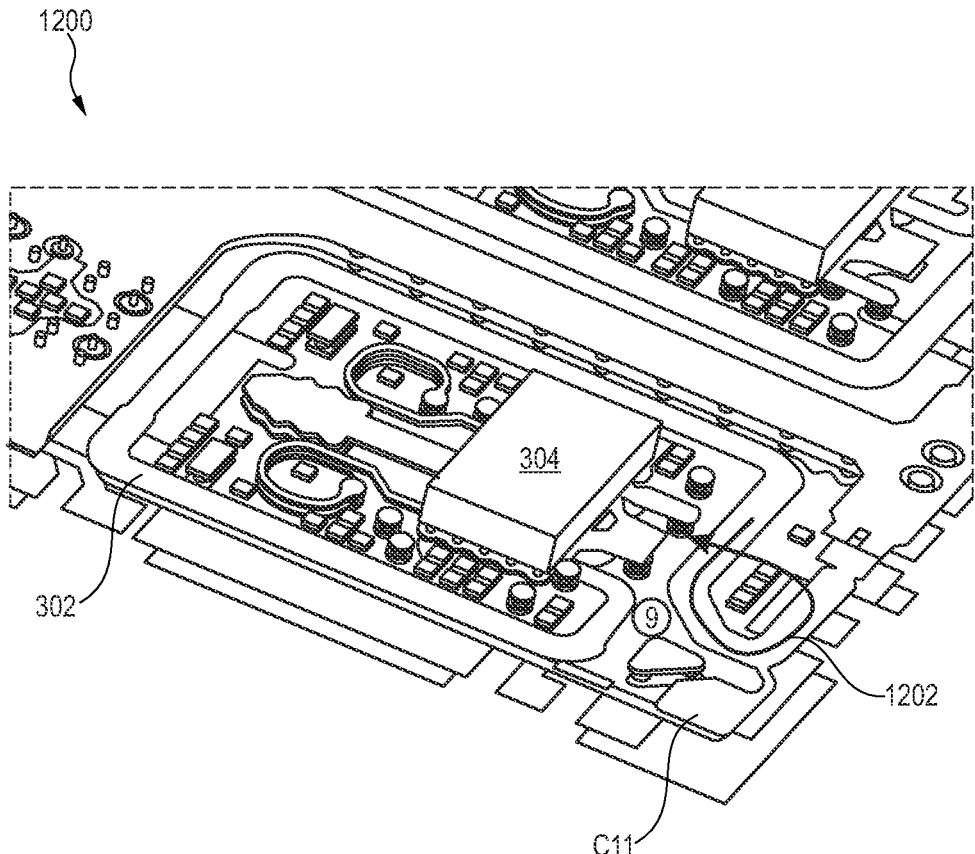
FIG. 12 is a perspective view of another embodiment of the high power TRX hybrid of FIG. 2, particularly showing a hybrid length extension that increases the physical length of hybrid with a secondary loop used to tune the hybrid to lower frequencies, according to an embodiment.

FIG. 12 is a perspective view 1200 of another embodiment of the high power TRX hybrid 200 of FIG. 2, particularly showing a hybrid length extension that increases the physical length of the hybrid with a secondary loop 1202 used to tune the hybrid to lower frequencies, according to an embodiment. The block and circuit diagram shown in FIG. 1 also applies to the embodiment shown in FIG. 12. However, some of the capacitor and inductor values for the lumped model of the two coupled lines 312 with respect to the embodiment of hybrid 200 shown in FIG. 2.

According to embodiments, a switch system 100 has been described that includes a multi-layer laminated hybrid 200 comprising a coupler 302, the coupler comprising a first metal layer 312A in a first metal layer M1 of the multi-layer laminated hybrid 200 having a first end coupled to a TERM termination terminal and a second end coupled to a "Q" quadrature terminal; and a second metal layer 312B in a second metal layer M2 of the multi-layer laminated hybrid 200 having a first end coupled to an ANT antenna terminal, and a second end coupled to an "I" in-phase terminal; and an integrated circuit RF switch 304 comprising a plurality of radio frequency (RF) switches S1, S2, S3, and S4 coupled to an upper surface of the multi-layer laminated hybrid 200, wherein the RF switches are electrically coupled to the quadrature terminal and to the in-phase terminal. According to embodiments, a method of operating the switch system comprises opening the plurality of RF switches in a receive mode of operation; and closing the plurality of RF switches in a transmit mode of operation to reflect RF power to the termination terminal. The termination terminal is coupled to a load, and RF power is dissipated in the load and the integrated circuit due to a transmit mode insertion loss, but wherein a majority of the RF power is reflected into the load. In an embodiment, at least 90% of the RF power is reflected into the load and less than 3% of the RF power is dissipated in the RF switch 304 integrated circuit.

Example embodiments of the present invention are summarized here. Other embodiments can also be understood from the entirety of the specification and the claims filed herein.

Example 1. According to an embodiment, a transceiver hybrid comprises a multi-layer laminated hybrid comprising a coupler, the coupler comprising a first metal layer in a first layer of the multi-layer laminated hybrid having a first end coupled to a termination terminal and a second end coupled to a quadrature terminal; and a second metal layer in a second layer of the multi-layer laminated hybrid having a first end coupled to an antenna terminal, and a second end coupled to an in-phase terminal, wherein a width of the first metal layer is greater than a width of the second metal layer, such that a registration error margin is formed between the first metal layer and the second metal layer.

Example 2. The transceiver hybrid of Example 1, wherein the coupler is formed in a periphery of the multi-layer laminated hybrid to form a routing loop eye opening.

Example 3. The transceiver hybrid of any of the above examples, wherein the first end of the first metal layer is directly connected to the termination terminal, and wherein the first end of the second metal layer is directly connected to the antenna terminal.

Example 4. The transceiver hybrid of any of the above examples, further comprising a first capacitor coupled between the termination terminal and the antenna terminal and/or a second capacitor coupled between the quadrature terminal and the in-phase terminal.

Example 5. The transceiver hybrid of any of the above examples, further comprising a first inductor coupled between the quadrature terminal and ground, and a second inductor coupled between the in-phase terminal and ground.

Example 6. The transceiver hybrid of any of the above examples, further comprising a third inductor formed in at least the first layer of the multi-layer laminated hybrid that is isolated from the quadrature terminal and the in-phase terminal, and a fourth inductor formed in at least the first layer of the multi-layer laminated hybrid that is isolated from the in-phase terminal.

Example 7. The transceiver hybrid of any of the above examples, wherein the third inductor is formed in the first layer and the second layer of the multi-layer laminated hybrid, and wherein the fourth inductor is formed in the first layer and the second layer of the multi-layer laminated hybrid.

Example 8. The transceiver hybrid of any of the above examples, wherein the coupler comprises a shielded signal structure.

Example 9. The transceiver hybrid of any of the above examples, wherein the shielded signal structure comprises first and second metal layers above the coupler, wherein the first and second metal layers have different widths.

Example 10. The transceiver hybrid of any of the above examples, wherein the shielded signal structure comprises first and second metal layer below the coupler, wherein the first and second metal layers have different widths.

Example 11. The transceiver hybrid of any of the above examples, further comprising a first current balancing structure coupled to the quadrature terminal, and a second current balancing structure coupled to the in-phase terminal.

Example 12. The transceiver hybrid of any of the above examples, further comprising a secondary loop coupled in series with the coupler configured to tune a frequency of the coupler and secondary loop to a frequency lower than a frequency of the coupler.

Example 13. According to an embodiment, a switch system comprises a multi-layer laminated hybrid comprising a coupler, the coupler comprising a first metal layer in a first layer of the multi-layer laminated hybrid having a first end coupled to a termination terminal and a second end coupled to a quadrature terminal; and a second metal layer in a second layer of the multi-layer laminated hybrid having a first end coupled to an antenna terminal, and a second end coupled to an in-phase terminal; and an integrated circuit comprising a plurality of radio frequency (RF) switches affixed to an upper surface of the multi-layer laminated hybrid, wherein the RF switches are electrically coupled to the quadrature terminal and to the in-phase terminal.

Example 14. The switch system of Example 13, wherein a width of the first metal layer is greater than a width of the second metal layer, such that a registration error margin is formed between the first metal and the second metal layer.

Example 15. The switch system of any of the above examples, wherein the integrated circuit comprises first and second RF switches configured for selectively coupling the quadrature terminal to ground, and third and fourth switches configured for selectively coupling the in-phase terminal to ground.

Example 16. The switch system of any of the above examples, wherein the multi-layer laminated hybrid comprises first and second inductors coupled to inputs of the integrated circuit, and third and fourth inductors coupled to outputs of the integrated circuit.

Example 17. According to an embodiment, a method of operating a switch system, the switch system including a multi-layer laminated hybrid comprising a coupler, the coupler comprising a first metal layer in a first layer of the multi-layer laminated hybrid having a first end coupled to a termination terminal and a second end coupled to a quadrature terminal; and a second metal layer in a second layer of the multi-layer laminated hybrid having a first end coupled to an antenna terminal, and a second end coupled to an in-phase terminal; and an integrated circuit comprising a plurality of radio frequency (RF) switches coupled to an upper surface of the multi-layer laminated hybrid, wherein the RF switches are electrically coupled to the quadrature terminal and to the in-phase terminal, the method comprising opening the plurality of RF switches in a receive mode of operation; and closing the plurality of RF switches in a transmit mode of operation to reflect RF power to the termination terminal.

Example 18. The method of Example 17, wherein the termination terminal is coupled to a load, wherein RF power is dissipated in the load and the integrated circuit due to a transmit mode insertion loss, and wherein a majority of the RF power is reflected into the load.

Example 19. The method of any of the above examples, wherein at least go % of the RF power is reflected into the load and less than 3% of the RF power is dissipated in the integrated circuit.

Example 20. The method of any of the above examples, wherein a width of the first metal layer is greater than a width of the second metal layer, such that a registration error margin is formed between the first metal layer and the second metal layer.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A transceiver hybrid comprising:
a multi-layer laminated hybrid comprising a coupler, the coupler comprising:
a first metal layer in a first layer of the multi-layer laminated hybrid having a first end coupled to a termination terminal and a second end coupled to a quadrature terminal; and a second metal layer in a second layer of the multi-layer laminated hybrid having a first end coupled to an antenna terminal, and a second end coupled to an in-phase terminal, wherein a width of the first metal layer is greater than a width of the second metal layer, such that a registration error margin is formed between the first metal layer and the second metal layer.

2. The transceiver hybrid of claim 1, wherein the coupler is formed in a periphery of the multi-layer laminated hybrid to form a routing loop eye opening.

3. The transceiver hybrid of claim 1, wherein the first end of the first metal layer is directly connected to the termination terminal, and wherein the first end of the second metal layer is directly connected to the antenna terminal.

4. The transceiver hybrid of claim 1, further comprising a first capacitor coupled between the termination terminal and the antenna terminal and/or a second capacitor coupled between the quadrature terminal and the in-phase terminal.

5. The transceiver hybrid of claim 1, further comprising a first inductor coupled between the quadrature terminal and ground, and a second inductor coupled between the in-phase terminal and ground.

6. The transceiver hybrid of claim 1, further comprising a third inductor formed in at least the first layer of the multi-layer laminated hybrid that is isolated from the quadrature terminal and the in-phase terminal, and a fourth inductor formed in at least the first layer of the multi-layer laminated hybrid that is isolated from the in-phase terminal.

7. The transceiver hybrid of claim 6, wherein the third inductor is formed in the first layer and the second layer of the multi-layer laminated hybrid, and wherein the fourth inductor is formed in the first layer and the second layer of the multi-layer laminated hybrid.

8. The transceiver hybrid of claim 1, wherein the coupler comprises a shielded signal structure.

9. The transceiver hybrid of claim 8, wherein the shielded signal structure comprises first and second metal layers above the coupler, wherein the first and second metal layers have different widths.

10. The transceiver hybrid of claim 8, wherein the shielded signal structure comprises first and second metal layers below the coupler, wherein the first and second metal layers have different widths.

11. The transceiver hybrid of claim 1, further comprising a first current balancing structure coupled to the quadrature terminal, and a second current balancing structure coupled to the in-phase terminal.

12. The transceiver hybrid of claim 1, further comprising a secondary loop coupled in series with the coupler configured to tune a frequency of the coupler and secondary loop to a frequency lower than a frequency of the coupler.

13. A switch system comprising:
a multi-layer laminated hybrid comprising a coupler, the coupler comprising a first metal layer in a first layer of the multi-layer laminated hybrid having a first end coupled to a termination terminal and a second end coupled to a quadrature terminal; and a second metal layer in a second layer of the multi-layer laminated hybrid having a first end coupled to an antenna terminal, and a second end coupled to an in-phase terminal; and an integrated circuit comprising a plurality of radio frequency (RF) switches affixed to an upper surface of the multi-layer laminated hybrid, wherein the RF switches are electrically coupled to the quadrature terminal and to the in-phase terminal.

14. The switch system of claim 13, wherein a width of the first metal layer is greater than a width of the second metal layer, such that a registration error margin is formed between the first metal layer and the second metal layer.

15. The switch system of claim 13, wherein the integrated circuit comprises first and second RF switches configured for selectively coupling the quadrature terminal to ground, and third and fourth switches configured for selectively coupling the in-phase terminal to ground.

16. The switch system of claim 13, wherein the multi-layer laminated hybrid comprises first and second inductors coupled to inputs of the integrated circuit, and third and fourth inductors coupled to outputs of the integrated circuit.

17. A method of operating a switch system, the switch system including a multi-layer laminated hybrid comprising a coupler, the coupler comprising a first metal layer in a first layer of the multi-layer laminated hybrid having a first end coupled to a termination terminal and a second end coupled to a quadrature terminal; and a second metal layer in a second layer of the multi-layer laminated hybrid having a first end coupled to an antenna terminal, and a second end coupled to an in-phase terminal; and an integrated circuit comprising a plurality of radio frequency (RF) switches coupled to an upper surface of the multi-layer laminated hybrid, wherein the RF switches are electrically coupled to the quadrature terminal and to the in-phase terminal, the method comprising:
opening the plurality of RF switches in a receive mode of operation; and
closing the plurality of RF switches in a transmit mode of operation to reflect RF power to the termination terminal.

18. The method of claim 17, wherein the termination terminal is coupled to a load, wherein the RF power is dissipated in the load and the integrated circuit due to a transmit mode insertion loss, and wherein a majority of the RF power is reflected into the load.

19. The method of claim 18, wherein at least 90% of the RF power is reflected into the load and less than 3% of the RF power is dissipated in the integrated circuit.

20. The method of claim 17, wherein a width of the first metal layer is greater than a width of the second metal layer, such that a registration error margin is formed between the first metal layer and the second metal layer.

* * * * *